US009201432B2

(12) United States Patent  
Somasundaram et al.

(10) Patent No.: US 9,201,432 B2  
(45) Date of Patent: Dec. 1, 2015

(54) HOME MONITORING SETTINGS BASED ON WEATHER FORECAST

(75) Inventors: Poothabalan Somasundaram, Tirunelveli (IN); Krishnakumar Sundaram, Erode (IN); Ganesh Ramasamy, Chennai (IN); Thamilenthi Palanivelu, Chennai (IN); Arunkumar Surulinathan, Pincode (IN); Pradeep Felix, Chennai (IN); Sundar Sivaraman, Tirunelveli (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 475 days.

(21) Appl. No.: 13/326,694

(22) Filed: Dec. 15, 2011

(65) Prior Publication Data

US 2013/0158721 A1   Jun. 20, 2013

(51) Int. Cl.
  *G05B 15/00*   (2006.01)
  *G05D 23/19*   (2006.01)

(52) U.S. Cl.
  CPC .................. *G05D 23/1917* (2013.01)

(58) Field of Classification Search
  USPC ............ 700/276, 278, 299, 291; 702/60, 104, 702/130; 374/11, 20
  See application file for complete search history.

(56) References Cited

U.S. PATENT DOCUMENTS

| 6,734,806 | B1 * | 5/2004 | Cratsley, III | 340/870.09 |
| 6,990,335 | B1 * | 1/2006 | Shamoon et al. | 455/419 |
| 2004/0194145 | A1 * | 9/2004 | Douillet et al. | 725/110 |
| 2009/0249428 | A1 * | 10/2009 | White et al. | 725/133 |
| 2011/0030016 | A1 * | 2/2011 | Pino et al. | 725/80 |
| 2011/0137757 | A1 * | 6/2011 | Paolini et al. | 705/27.1 |
| 2011/0252328 | A1 * | 10/2011 | Karaoguz | 715/736 |
| 2012/0011233 | A1 * | 1/2012 | Dixon et al. | 709/221 |
| 2012/0083927 | A1 * | 4/2012 | Nakamura et al. | 700/278 |
| 2013/0088154 | A1 * | 4/2013 | Van Hoof et al. | 315/152 |
| 2013/0173064 | A1 * | 7/2013 | Fadell et al. | 700/276 |
| 2013/0332000 | A1 * | 12/2013 | Imes et al. | 700/291 |

OTHER PUBLICATIONS

Author: C.D. Barley, C. Haley and R. Anderson; Title: Bulding America System Reserch Plan for Reduction of Miscellaneous Electrical Loads in Zero Energy Homes, Publisger: US Dept of Energy; Nov. 2008; 39 pages.*

* cited by examiner

*Primary Examiner* — Kenneth M Lo
*Assistant Examiner* — MD N Mia (57) ABSTRACT

A system may include a set-top box, associated with a customer premises, configured to receive a television signal and provide the television signal to a television and a home monitoring device configured to obtain a weather forecast for a geographic area associated with the customer premises, determine a thermostat setting for the customer premises based on the obtained weather forecast, and provide a recommendation about the determined thermostat setting to the set-top box. The set-top box may be further configured to present the recommendation about the determined thermostat setting via the television; receive a selection of the determined thermostat setting; and provide an indication of the selection to the home monitoring device; and the home monitoring device may be further configured to apply the determined thermostat setting to a thermostat controller associated with the customer premises, in response to receiving the indication from the set-top box.

20 Claims, 9 Drawing Sheets

HOME MONITORING SETTINGS BASED ON WEATHER FORECAST

BACKGROUND INFORMATION

A user may install a home monitoring system that includes a thermostat. The thermostat may maintain a set temperature in the user's home by controlling a heating system and/or a cooling system. For example, if the temperature inside the home drops below the set temperature, the thermostat may activate a heating system to raise the temperature to the set temperature. The user may select a particular set temperature for the thermostat. However, the user's selected set temperature may not be optimal.

DETAILED DESCRIPTION OF PREFERRED EMBODIMENTS

The following detailed description refers to the accompanying drawings. The same reference numbers in different drawings identify the same or similar elements.

A customer may program a thermostat to a desired temperature. The thermostat may include a temperature sensor that measures air temperature and may maintain the customer's home (referred to herein as "customer premises") at the desired temperature by measuring the air temperature inside the home. However, the air temperature may not accurately correlate to thermal comfort, because thermal comfort may depend on other factors. For example, thermal comfort may also depend on the mean radiant temperature of the walls, floor, and ceiling of the home. A mean radiant temperature that is lower than the air temperature may cause an occupant of the home to radiate heat to the walls, floor, and ceiling of the home, leading to lower thermal comfort. Furthermore, the enclosures of the home may take significantly longer to heat up than the air temperature, leading to a longer heat up time to a perceived thermal comfort level when the set temperature of the thermostat is increased. Conversely, when cooling the home in the summer, the enclosures of the home may retain heat, resulting in a lower thermal comfort level due to a perceived higher temperature. Furthermore, thermal comfort may also depend on humidity level. A low humidity level may result in unperceived heat loss through perspiration and/or respiration and a high humidity level may prevent heat loss in the summer, leading to a lower thermal comfort. A weather forecast may be used to anticipate effects on thermal comfort with respect to a set thermostat temperature. Furthermore, a weather forecast, together with information about the customer premises, such as thermostat setting history, data from an energy meter, and/or a type of heating and/or cooling system, may be used to optimize settings for a thermostat in order to minimize energy use and optimize thermal comfort.

An implementation described herein may relate to determining one or more thermostat settings for a thermostat based on a weather forecast. A home monitoring system may be installed on customer premises and may enable a customer to monitor and/or control various aspects of the user's home. The home monitoring system may include one or more home monitoring devices, such as video cameras, light control devices, lock control devices, security sensors, a thermostat, and/or an energy meter. The home monitoring system may be integrated with a system for providing television services to the customer via a set-top box.

An implementation described herein may relate to obtaining a weather forecast for a geographic area associated with a customer premises, determining one or more thermostat settings for the customer premises based on the obtained weather forecast, and applying the determined thermostat settings to a thermostat controller associated with the customer premises. The determined thermostat setting may be provided as a recommendation to a customer, by a home monitoring module of the home monitoring system, via a set-top box. The customer may select to approve or disapprove the recommendation via the set-top box and, if the recommendation is approved, the home monitoring system may apply the recommended thermostat setting to the thermostat controller.

Furthermore, the determined thermostat settings may be modified based on one or more parameters, such as a thermostat setting history associated with the customer premises, energy meter data associated with the customer premises, and/or a type of heating system or cooling system associated with the customer premises. Moreover, the weather forecast may be used to determine an optimum setting for another aspect of the home monitoring system, such as a motion sensor and/or a light controller.

Figure 1:
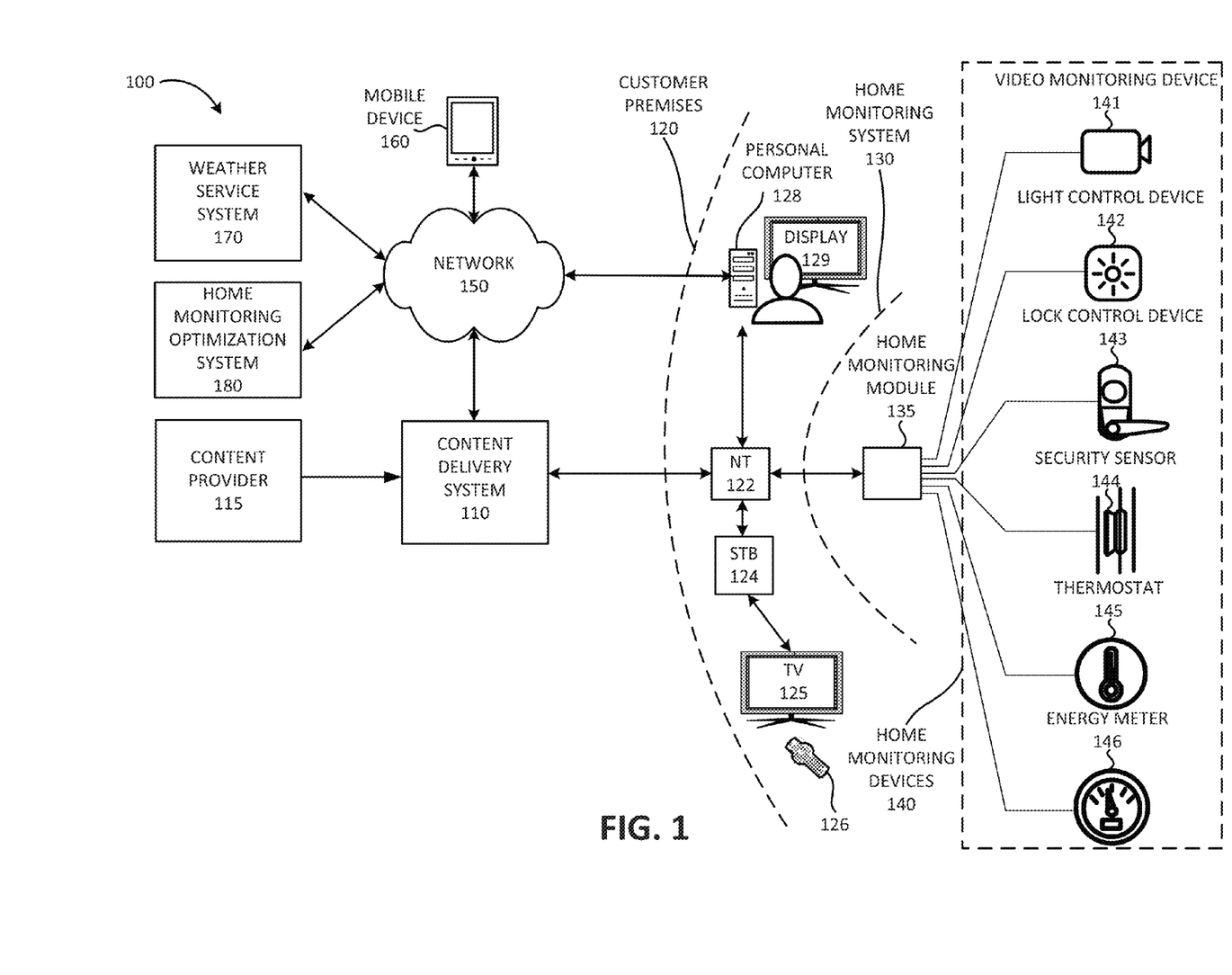
FIG. 1 is a diagram illustrating an exemplary environment according to an implementation described herein.

FIG. 1 is a diagram of an exemplary environment 100 in which the systems and/or methods described herein may be implemented. As shown in FIG. 1, environment 100 may include a content delivery system 110, a content provider 115, customer premises 120, a network 150, a mobile device 160, a weather service system 170, and a home monitoring optimization system 180. While FIG. 1 depicts a single content delivery system 110, a single content provider 115, a single customer premises 120, a single network 150, and a single mobile device 160 for illustrative purposes, in practice, environment 100 may include multiple content delivery systems 110, multiple content providers 115, multiple customer premises 120, multiple networks 150, and/or multiple mobile devices 160.

Content delivery system 110 may include one or more devices, such as server devices, that ingest content, store content, format content, and/or deliver content to customer premises 120 and/or mobile device 160. For example, content delivery system 110 may provide television channels, including content received from content provider 115. While content delivery system 110 is illustrated in FIG. 1 as connecting to a single customer premises 120 for explanatory purposes, in practice, content delivery system 110 may connect to multiple customer premises 120 (and/or to multiple mobile devices 160).

Content provider 115 may include one or more devices, such as server devices, that provide content to content delivery system 110. For example, content provider 115 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 115 may also include on-demand content providers (e.g., video on demand (VOD), pay per view (PPV), etc.).

Customer premises 120 may include a particular location (or multiple locations) associated with a customer. For example, customer premises 120 may include the customer's home. Devices associated with customer premises 120, as well as mobile device 160, may receive content, such as video content, via content delivery system 110. Devices associated with customer premises 120, as well as mobile device 160, may be considered "user devices," "customer devices," and/or "network devices." Customer premises 120 may include a network terminal (NT) 122, a set top box (STB) 124, a television 125, a remote control 126, a personal computer 128, a display 129, and a home monitoring system 130.

NT 122 may receive content from content delivery system 110 via a connection, such as, for example, via a fiber optic cable connection, a coaxial cable connection, a wireless connection, and/or another type of connection. Furthermore, NT 122 may send information from a device associated with customer premises 120 to content delivery system 110. In one implementation, NT 122 may include an optical network terminal and content delivery system 110 may form part of a high-speed fiber optic network. In another implementation, NT 122 may include a cable modem. In yet another implementation, NT 122 may include a fixed wireless transceiver, a WiFi access point, and/or a Bluetooth device. Additionally or alternatively, NT 122 may include a layer 2 and/or layer 3 network device, such as a switch, router, firewall, and/or gateway. Customer premises 120 may receive one or more services via the connection between NT 122 and content delivery system 110, such as, for example, a television service, Internet service, and/or voice communication (e.g., telephone) service.

STB 124 may receive content and output the content to television 125 for display. STB 124 may include a component (e.g., a cable card or a software application) that interfaces with (e.g., plugs into) a host device (e.g., a personal computer, television 125, a stereo system, etc.) and allows the host device to display content. STB 124 may also be implemented as a home theater personal computer (HTPC), an optical disk player (e.g., digital video disk (DVD) or Blu-Ray™ disc player), a cable card, etc. STB 124 may receive commands and/or other type of data from other devices, such as remote control 126, and may transmit the data to other devices in environment 100.

Television 125 may output content received from STB 124. Television 125 may include speakers as well as a display. Remote control 126 may issue wired or wireless commands for controlling other electronic devices, such as television 125 and/or STB 124. Remote control 126, in conjunction with STB 124, may allow a customer to interact with an application running on STB 124, such as an application to provide content from a shared local government channel. Other types of devices (e.g., a keyboard, mouse, mobile phone, etc.) may be used instead of, or in addition to, remote control 126, in order to control television 125 and/or STB 124.

Personal computer 128 may include a desktop computer, a laptop computer, a tablet computer, a mobile communication device, a personal digital assistant (PDA), or another type of computation and/or communication device. Personal computer 128 may include a microphone to capture audio and a camera to capture images or video. Personal computer 128 may include display 129 for displaying images and/or video content received from content delivery system 110. Personal computer 128 may also include a speaker for playing audio signals.

Home monitoring system 130 may include one or more devices that enable a customer to monitor and/or control various aspects of customer premises 120. Home monitoring system 130 may include a home monitoring module 135 and one or more home monitoring devices 140 (referred to herein collectively as "home monitoring devices 140" and individually as "home monitoring device 140"). For example, home monitoring devices 140 may include a video monitoring device 141, a light control device 142, a lock control device 143, a security sensor 144, a thermostat 145, and/or an energy meter 146.

Home monitoring module 135 may control and/or manage home monitoring devices 140 and may interface with other devices in environment 100, such as NT 122, STB 124, and/or weather service system 170. For example, home monitoring module 135 may control thermostat 145 based on information obtained from weather service system 170 and/or home monitoring optimization system 180.

Video monitoring device 141 may correspond to a security camera. Video monitoring device 141 may include a motion detector that detects motion within a field of view of the video monitoring device 141. Light control device 142 may include a device for turning on a light, turning of a light, or dimming a light associated with customer premises 120. Lock control device 143 may control a lock (e.g., window lock, door lock, etc.) associated with customer premises 120. Security sensor 144 may include a sensor that may inform home monitoring module 135 of a change in a particular parameter associated with customer premises 120. For example, security sensor 144 may include a door or window sensor, a motion sensor, a hear sensor, a pressure sensor, and/or any other type of security sensor. Thermostat 145 may control a heater and/or an air conditioning unit associated with customer premises 120 to keep customer premises 120 at a set temperature. Energy meter 146 may include one or more sensor to monitor energy usage associated with customer premises 120.

Network 150 may include one or more wired and/or wireless networks. For example, network 150 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof, and/or another type of wireless network. Additionally, or alternatively, network 150 may include a local area network (LAN), a wide area network (WAN), a metropolitan area network (MAN), an ad hoc network, an intranet, a fiber optic-based network (e.g., a fiber optic service (FiOS) network), a television network, and/or a combination of these or other types of networks. Network 150 may enable content delivery system 110 to communicate with mobile device 160 and/or with weather service system 170.

Mobile device 160 may include a mobile communication device, such as a mobile phone, a smart phone, a tablet computer, a laptop, a PDA, or another type of portable communication device. Mobile device 160 may receive content, such as content from a shared local government channel, from content delivery system 110 via network 150. In one embodiment, mobile device 160 may be associated with a customer account associated with customer premises 120. In another embodiment, mobile device 160 need not be associated with customer premises 120.

Weather service system 170 may include one or more devices, such as server devices, that generate a weather forecast for a particular geographic area. For example, weather service system 170 may generate a weather forecast that predicts, for a future time, expected average, low, and/or high temperatures, humidity, solar intensity, wind speed and direction, and/or any other weather parameter associated with the particular geographic area.

Home monitoring optimization system 180 may include one or more devices, such as server devices, that determine optimum settings for devices associated with home monitoring system 130. For example, home monitoring optimization system 180 may determine optimum thermostat settings for thermostat 145, light control device 142, and/or for a sensor associated with video monitoring device 141 or associated with security sensor 144.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
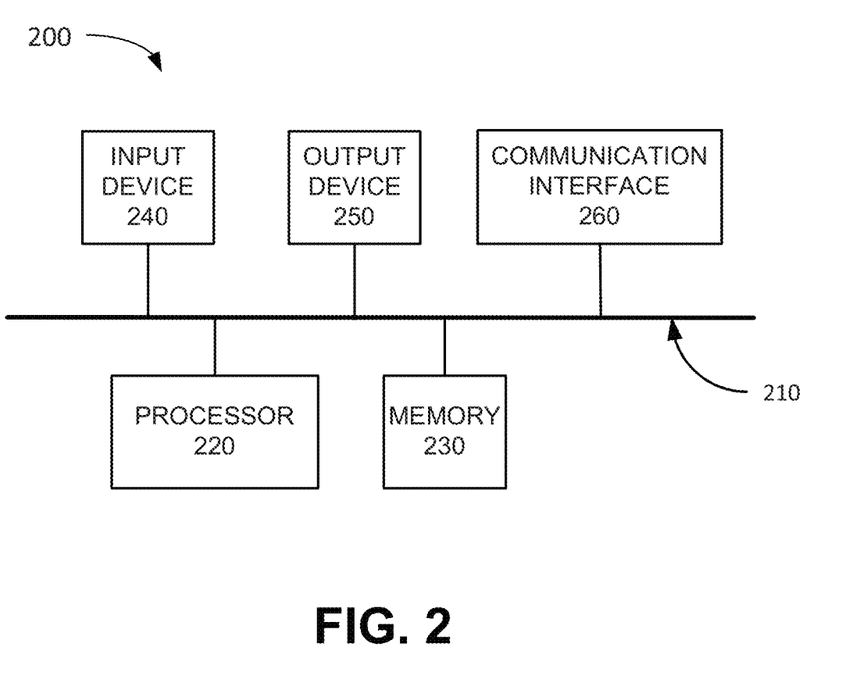
FIG. 2 is a diagram illustrating exemplary components of a device of FIG. 1.

FIG. 2 is a diagram illustrating exemplary components of a device 200 according to an implementation described herein. Home monitoring module 135, STB 124, personal computer 128, mobile device 160 and/or home monitoring optimization system 180 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to determining an optimum thermostat setting and/or adjusting other aspects of home monitoring system 130. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
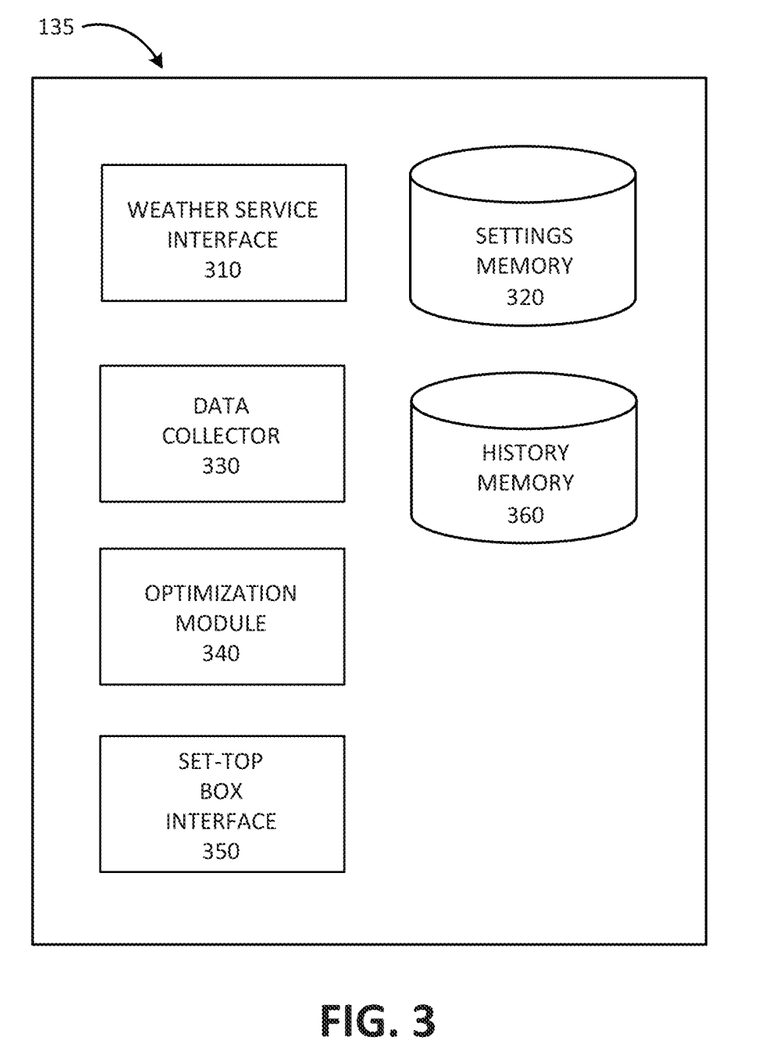
FIG. 3 is a diagram illustrating exemplary functional components of the home monitoring module of FIG. 1.

FIG. 3 is a diagram illustrating exemplary functional components of home monitoring module 135. The function components of home monitoring module 135 may be implemented, for example, via processor 220 executing instructions from memory 230. As shown in FIG. 3, home monitoring module 135 may include a weather interface 310, a settings memory 320, a data collector 330, an optimization module 340, a set-top box interface 350, and a history memory 360.

Weather interface 310 may obtain a weather forecast from weather service system 170. For example, weather interface 310 may obtain a forecast for a future time period (e.g., next 24 hours), which includes information about an expected high temperature, an expected low temperature, an expected humidity, an expected solar intensity, an expected wind intensity, a sunrise time, a sunset time, and/or any other parameter associated with a weather forecast.

Settings memory 320 may store one or more tables that each relate a particular factor to one or more thermostat settings. Exemplary components of settings memory 320 are described below with reference to FIG. 4.

Data collector 330 may obtain data associated with thermostat device 145 and/or other devices associated with home monitoring system 130. For example, data collector 330 may collect information about previous thermostat settings and store the information in history memory 360. Furthermore, data collector 330 may obtain information from energy meter 146, may obtain information data about a heating system associated with customer premises 120, may obtain information data about a cooling system associated with customer premises 120, may obtain information associated with security sensor 144, and/or may obtain any other data associated with home security system 130. The obtained information may be stored in settings memory 320.

Optimization module 340 may optimize one or more thermostat settings for thermostat device 145 based on a weather forecast obtained by weather service interface 310 and/or based on information obtained by data collector 330. For example, optimization module 340 may determine a temperature profile for a particular time period (e.g., a particular day) based on the obtained weather forecast, and may determine a temperature offset to one or more thermostat settings based on the determined temperature profile. For example, optimization module 340 may determine a temperature offset based on an estimated mean radiant temperature profile over the particular time period for customer premises 120. The estimated mean radiant temperature profile may be based on the determined temperature profile and based on information stored in history memory 360, such as, for example, data associated with thermostat settings selected by the customer and/or data obtained from energy meter 146.

As another example, optimization module 340 may determine a humidity offset based on a predicted humidity level included in the obtained weather forecast. As yet another example, optimization module 340 may determine an offset based on a predicted solar intensity included in the obtained weather forecast and/or may determine an offset based on a predicted wind intensity included in the obtained weather forecast. As yet another example, optimization module 340 may optimize thermostat settings for thermostat device 145 to minimize energy use, based on the obtained weather forecast and based on data obtained from energy meter 146.

In another implementation, some or all of the optimization determinations described above with respect to optimization module 340 may be performed by home monitoring optimization system 180 and information about the optimization determinations may be provided by home monitoring optimization system 180 to optimization module 340.

Set-top box interface 350 may provide recommendation about one or more determined thermostat settings to STB 124. STB 124 may present the one or more determined thermostat settings to the customer via television 125. Set-top box interface 350 may also provide the obtained weather forecast to STB 124 in connection with the recommendation and STB 124 may present the obtained weather forecast in connection with the recommendation. The customer may select to accept or decline the recommendation via remote control 126 and STB 124 may provide information about the selection to set-top box interface 350.

History memory 360 may store information about the history of thermostat device 145 and/or about another device associated with home monitoring system 130. Exemplary components of settings memory 320 are described below with reference to FIG. 4.

Although FIG. 3 shows exemplary functional components of home monitoring module 135, in other implementations, home monitoring module 135 may include fewer functional components, different functional components, differently arranged functional components, or additional functional components than depicted in FIG. 3. Additionally or alternatively, one or more functional components of home monitoring module 135 may perform functions described as being performed by one or more other functional components of home monitoring module 135.

Figure 4:
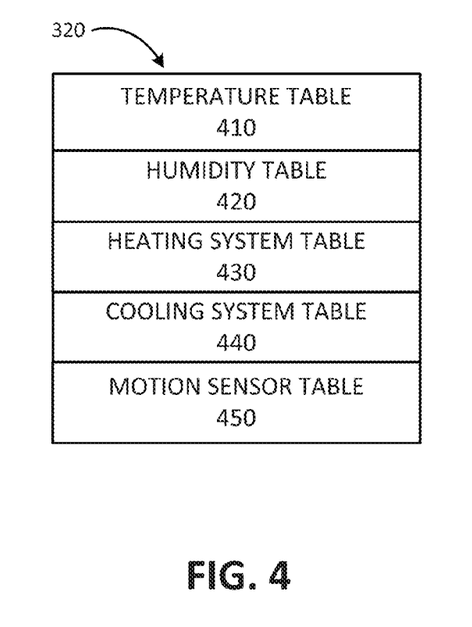
FIG. 4 is a diagram illustrating exemplary components of the settings memory of FIG. 3.

FIG. 4 is a diagram illustrating exemplary components of settings memory 320. As shown in FIG. 4, settings memory 320 may include a temperature table field 410, a humidity table field 420, a heating system table field 430, a cooling system table field 440, and a motion sensor table 450.

Temperature table field 410 may include a table that relates a particular thermostat setting and a particular predicted temperature to a particular temperature offset. In one example, the temperature offset may be based on an estimated difference between a mean radiant temperature, based on the particular predicted temperature, and an air temperature, based on the thermostat setting.

Humidity table field 420 may include a table that relates a particular humidity level to a particular temperature offset. In another implementation, the table may relate a particular humidity level to the particular temperature offset for a particular thermostat setting. The temperature offset may be based on, for example, an estimated effect that the particular humidity level may have on thermal comfort.

Heating system table field 430 may include information about a particular type of heating system associated with customer premises 120. As an example, heating system table field 430 may include a table that relates particular operating temperatures to particular energy efficiencies (e.g., a heating system may operate more efficiently at a first temperature than at a second temperature). As another example, heating system table field 430 may include a table that relates particular operating times to particular energy efficiencies (e.g., a heating system may operate more efficiently when operating for a length of a first interval then when operating for a length of a second interval). As yet another example, heating system table field 430 may include a table that relates particular operating temperatures to particular thermal comfort temperature offset values. Information included in heating system table field 430 may be obtained, for example, from a manufacturer associated with the heating system via home monitoring optimization system 180.

Cooling system table field 440 may include information about a particular type of cooling system associated with customer premises 120. As an example, cooling system table field 440 may include a table that relates particular operating temperatures to particular energy efficiencies (e.g., a cooling system may operate more efficiently at a first temperature than at a second temperature). As another example, cooling system table field 440 may include a table that relates particular operating times to particular energy efficiencies (e.g., a cooling system may operate more efficiently when operating for a length of a first interval then when operating for a length of a second interval). As yet another example, cooling system table field 440 may include a table that relates particular operating temperatures to particular thermal comfort temperature offset values. Information included in cooling system table field 440 may be obtained, for example, from a manufacturer associated with the heating system via home monitoring optimization system 180.

Motion sensor table 450 may include information about a motion sensor associated with customer premises 120, such as a motion sensor associated with video monitoring device 141 and/or a motion sensor associated with security sensor 144. For example, motion sensor table 450 may include a table that relates temperatures to motion sensor sensitivity settings, a table that relates humidity levels to motion sensor sensitivity settings, and/or another table that relates a particular weather parameter to motion sensor sensitivity settings.

Although FIG. 4 shows exemplary components of settings memory 320, in other implementations, settings memory 320 may include fewer components, different components, differently arranged components, or additional components than depicted in FIG. 4.

Figure 5:
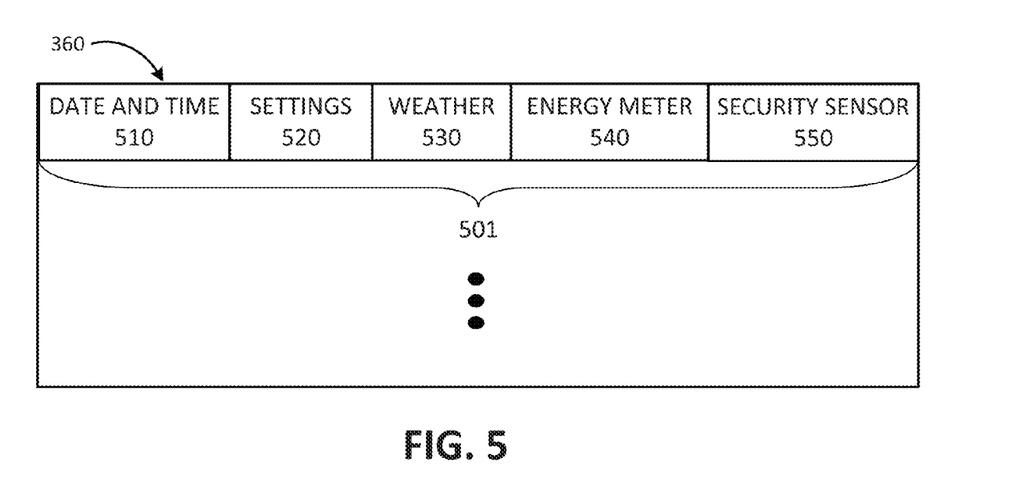
FIG. 5 is a diagram illustrating exemplary components of the history memory of FIG. 3.

FIG. 5 is a diagram illustrating exemplary components of history memory 360. As shown in FIG. 5, history memory 360 may include one or more thermostat history records 501 (referred to herein collectively as "thermostat history records 501" and individually as "thermostat history record 501"). Each thermostat history record 501 may include information about thermostat device 145 and/or energy meter device 146 at a particular date and time. In particular, each thermostat history record 501 may include date and time field 510, settings field 520, weather field 530, energy meter field 540, and a security sensor field 550.

Date and time field 510 may store information identifying a particular date and time. Settings field 520 may store information about a thermostat temperature setting associated with the particular date and time.

Weather field 530 may store information about a weather forecast, and/or about measured weather parameters, associated with the particular date and time. For example, weather field 530 may include information about a predicted high temperature, a predicted low temperature, an expected humidity level, an expected solar intensity, an expected wind intensity, a sunrise time, a sunset time, and/or any other expected weather parameter associated with the particular date. Additionally or alternatively, weather field 530 may include information about a measured temperature, measured humidity level, a measured solar intensity, a measured wind intensity, and/or another measured parameter associated with the particular date and time. The measured parameters may be obtained from weather service system 170 by weather service interface 310.

Energy meter field 540 may store information obtained from energy meter 146 and associated with the particular date and time. For example, energy meter field 540 may include information about how much energy a heating system or a cooling system, associated with customer premises 120, was using at the particular date and time.

Security sensor field 550 may include information obtained from a sensor associated with home monitoring system 130, such as security sensor 144. For example, security sensor 144 may include a motion sensor and the information may include information about activity within customer premises 120, such as whether anyone was home and/or whether anyone was active. Furthermore, security sensor field 550 may include information from light control device 142, such as whether lights were turned on inside customer premises 120.

Although FIG. 5 shows exemplar components of history memory 360, in other implementations, history memory 360 may include fewer components, different components, differently arranged components, or additional components than depicted in FIG. 5.

Figure 6:
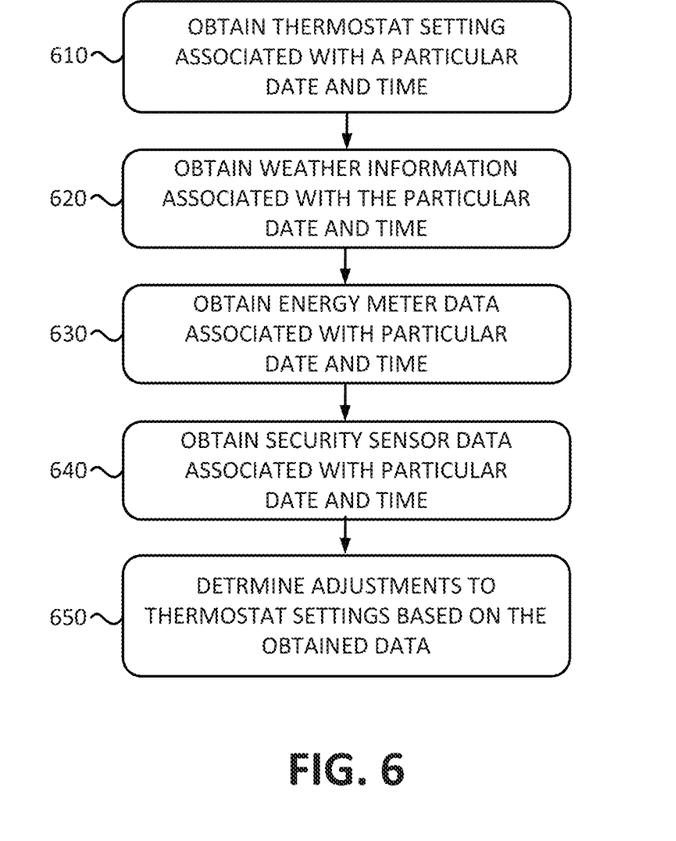
FIG. 6 is a flow chart of an exemplary process for obtaining data relating to thermostat settings according to an implementation described herein.

FIG. 6 is a flow chart of an exemplary process for obtaining data relating to thermostat settings according to an implementation described herein. In one implementation, the process of FIG. 6 may be performed by home monitoring module 135. In other implementations, some or all of the process of FIG. 6 may be performed by another device or a group of devices separate from home monitoring module 135 and/or including home monitoring module 135. For example, in another implementation, some or all of the process of FIG. 6 may be performed by STB 124 or by home monitoring optimization system 180.

The process of FIG. 6 may include obtaining a thermostat setting associated with a particular date and time (block 610). For example, data collector 330 may collect information about a particular thermostat temperature setting, associated with a particular date and time, and store the information in history memory 360. As an example, data collector 330 may generate a new history record 501 at each particular interval and store the thermostat setting in settings field 520 of the new history record 501.

Weather information associated with the particular date and time may be obtained (block 620). For example, weather service interface 310 may obtain information about weather parameters that were measured for the particular date and time from weather service system 170. For example, weather service interface 310 may obtain a measured temperature at the particular date and time, a measured humidity level at the particular date and time, a measured solar intensity, a measured wind intensity, and/or any other measured weather parameter. Data collector 330 may store the obtained information about the measured weather parameters in weather field 530 of the new history record 501.

Energy meter data associated with the particular date and time may be obtained (block 630). For example, data collector 330 may obtain past data information from energy meter 146 about how much energy customer premises 120 is consuming at the particular date and time. Data collector 330 may be able to determine how much of the consumed energy is being consumed by a heating system or a cooling system associated with customer premises 120. Data collector 330 may store the obtained information about how much energy the heating system or cooling system has been consuming at the particular date and time in energy meter field 540 of the new history record 501.

Security sensor data associated with the particular date and time may be obtained (block 640). For example, data collector 330 may obtain information from one or more security sensors 144 located in customer premises 120 about the amount of activity at customer premises 120. For example, data collector 330 may be able to determine whether the residents of customer premises 120 are at home and/or whether the residents are sleeping. Data collector 330 may store the obtained information about the amount of resident activity at the particular date and time in security sensor field 550 of the new history record 501.

Adjustments to thermostat settings may be determined based on the obtained data (block 650). As an example, optimization module 340 may compare a thermostat setting, set by a customer, to a measured temperature, or to another measured weather parameter, to determine the customer's thermal comfort with respect to the measured temperature or the other measured weather parameter. Optimization module 340 may use this information to determine an offset to a thermostat setting based on a predicted temperature, or another weather parameter, included in an obtained weather report.

As another example, optimization module 340 may determine, given a particular measured temperature, or another measured weather parameter, and based on data obtained from energy meter 146, how long it takes the heating system or cooling system to reach a particular temperature. Optimization module 340 may use this information to determine a set of thermostat settings to ramp up or ramp down the temperature so that the temperature reaches a set temperature at a particular time.

As yet another example, optimization module 340 may determine, given data obtained from security sensor 144, when residents associated with customer premises 120 are not home and/or when the residents are asleep. Optimization module 340 may use this information to suggest set back times for thermostat 145 to reduce the set temperature in order to save energy.

Figure 7:
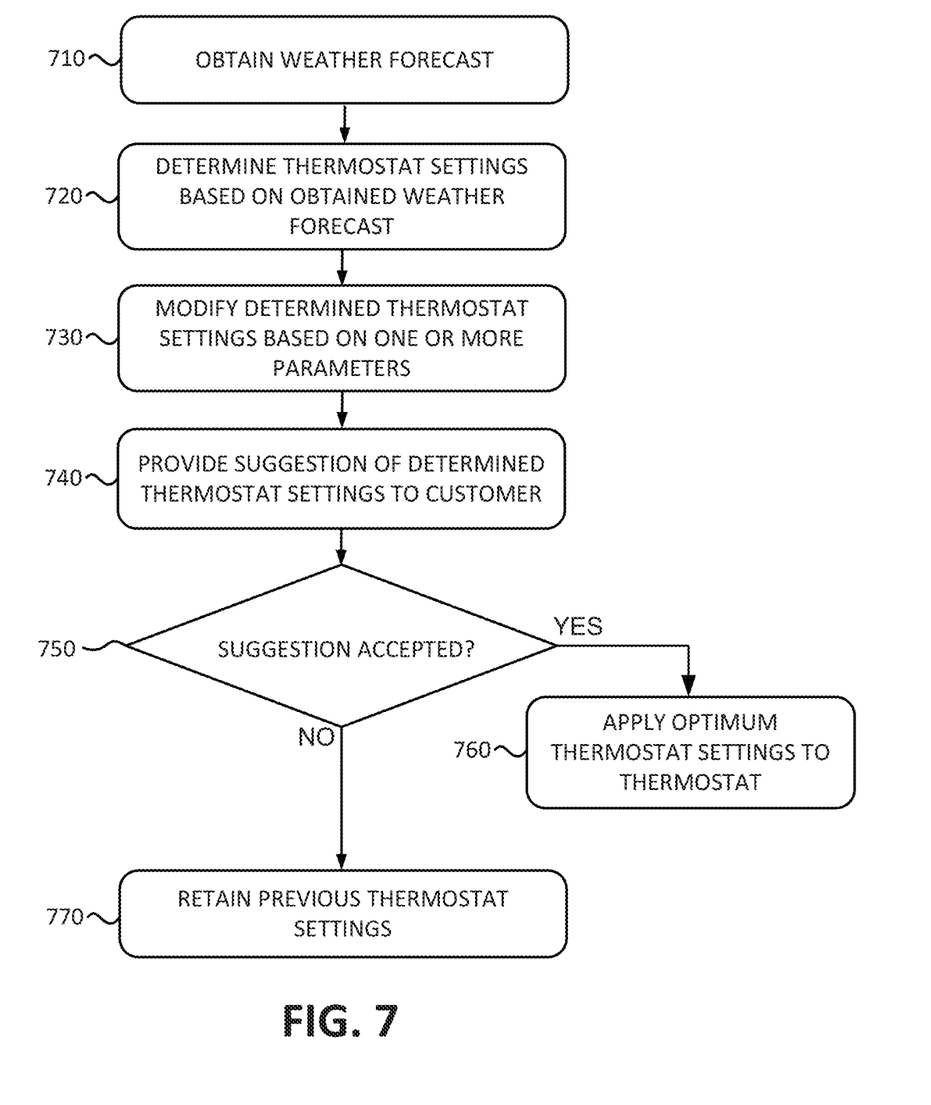
FIG. 7 is a flow chart of an exemplary process for determining an optimum thermostat setting according to an implementation described herein.

FIG. 7 is a flow chart of an exemplary process for determining an optimum thermostat setting according to an implementation described herein. In one implementation, the process of FIG. 7 may be performed by home monitoring module 135. In other implementations, some or all of the process of FIG. 7 may be performed by another device or a group of devices separate from home monitoring module 135 and/or including home monitoring module 135. For example, in another implementation, some or all of the process of FIG. 7 may be performed by STB 124 or by home monitoring optimization system 180.

The process of FIG. 7 may include obtaining a weather forecast (block 710). For example, weather service interface 310 may obtain a weather report for the next 24 hours. One or more thermostat settings may be determined based on the obtained weather forecast (block 720). For example, optimization module 340 may determine a temperature profile over the next 24 hours based on a predicted high temperature and a predicted low temperature included in the obtained weather report. Based on the determined temperature profile, optimization module 24 may determine a temperature offset for a particular time from temperature table 410, given a predicted temperature from the determined temperature profile at the particular time, and given a thermostat setting at the particular time. For example, if the customer has set thermostat 145 to 68° F. at 8 AM, and if the predicted temperature at 8 AM is 30° F., optimization module 340 may determine a temperature offset of 4° F. from temperature table 410 and may suggest a temperature setting of 72° F. The suggested temperature setting may correspond to a temperature that may correspond to an estimated high thermal comfort for the customer, given an estimated difference between the air temperature achieved by the thermostat setting and the mean radiant temperature, which may depend on the outside temperature.

The determined thermostat settings may be modified based on one or more parameters (block 730). As an example, optimization module 340 may modify the determined thermostat settings based on another weather parameter, such as a predicted humidity level, a predicted solar intensity, a predicted wind intensity, and/or another predicted weather parameter. For example, if a predicted humidity level is low in winter, optimization module 340 may adjust a determined thermostat setting to a higher temperature to account for an increased heat loss due to the low humidity level. As another example, if a predicted humidity level is high in the summer, optimization module 340 may adjust a determined thermostat setting to a lower temperature to cause a cooling system to operate more frequently, in order to reduce the humidity level inside of customer premises 120. As yet another example, if a predicted solar intensity is high (e.g., a sunny day with no clouds), an offset to a thermostat setting due to predicted low temperatures outside may be decreased. As yet another example, if a predicted wind intensity is high, an offset to a thermostat setting due to predicted low temperatures may be decreased.

As another example, optimization module 340 may modify a determined thermostat setting based on data obtained from energy meter 146. For example, if a thermostat setting is set back to a lower temperature at a time after a customer leaves for work, optimization module 340 may lower the setback temperature to a minimum temperature that will allow customer premises 120 to be re-heated in time for the customer's return, thereby maximizing energy savings.

As yet another example, optimization module 340 may modify a determined thermostat setting based on information associated with a heating system or a cooling system based on information stored in heating system table 430 or cooling system table 440. For example, a heating system may be associated with a particular ramping curve to change from a first temperature to a second temperature that minimizes energy use. Optimization module 340 may apply a set of thermostat settings based on the ramping curve when changing a thermostat setting from a first setting to a second setting.

A suggestion of the determined thermostat settings may be provided to the customer (block 740). For example, home monitoring module 135 may generate a recommendation that includes the determined thermostat settings and may provide the generated recommendation to STB 124. STB 124 may present the generated recommendation to the customer via television 125.

A determination may be made as to whether the suggestion was accepted (block 750). For example, the customer may use remote control 126 to either accept or reject the recommended thermostat setting and STB 124 may forward the selection to home monitoring module 135. If the suggestion was accepted, the optimum thermostat settings may be applied to the thermostat (block 760). For example, optimization module 340 may apply the determined thermostat settings to thermostat device 145. If the suggestion was not accepted, previous thermostat settings may be retained (block 770). For example, optimization module 340 may retain the current settings associated with thermostat device 145.

Figure 8:
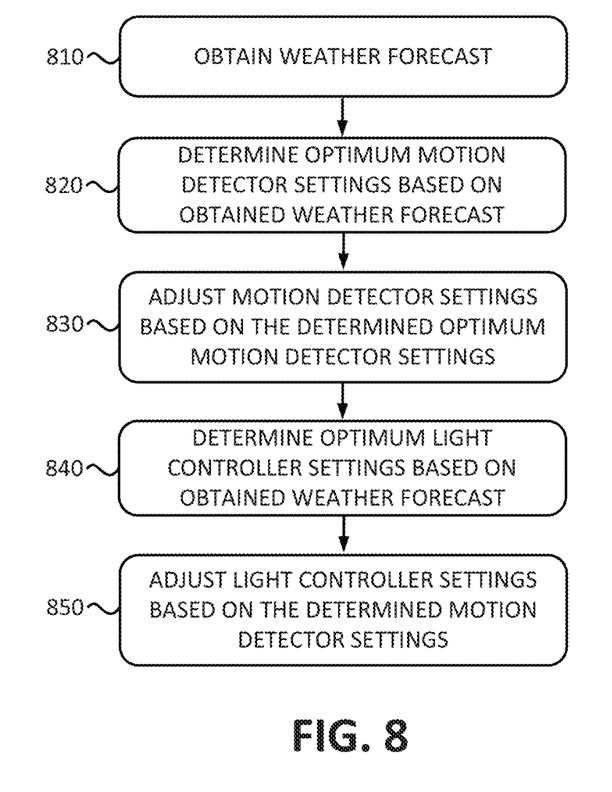
FIG. 8 is a flow chart of an exemplary process for adjusting motion detectors and light controllers according to an implementation described herein.

FIG. 8 is a flow chart of an exemplary process for adjusting motion detectors and light controllers according to an implementation described herein. In one implementation, the process of FIG. 8 may be performed by home monitoring module 135. In other implementations, some or all of the process of FIG. 8 may be performed by another device or a group of devices separate from home monitoring module 135 and/or including home monitoring module 135. For example, in another implementation, some or all of the process of FIG. 8 may be performed by STB 124 or by home monitoring optimization system 180.

The process of FIG. 8 may include obtaining a weather forecast (block 810). For example, weather service interface 310 may obtain a weather report for the next 24 hours. Optimum motion detector settings may be determined based on the obtained weather forecast (block 820) and motion detector settings may be adjusted based on the determined optimum motion detector settings (block 830). For example, optimization module 340 may access settings memory 320 to determine a particular motion detector setting associated with the obtained weather forecast. For example, if the predicted temperature is below freezing, the sensitivity of a motion detector, associated with video monitoring device 141, may be increased to compensate for the low predicted temperature. As another example, if the weather forecast includes heavy rain, the sensitivity of the motion detector, associated with video monitoring device 141, may be decreased to take into account irrelevant motion that may be caused by the rain.

Optimum light controller settings may be determined based on the obtained weather forecast (block 840) and light controller settings may be adjusted based on the determined optimum light controller settings (block 850). As an example, optimization module 340 may set light control device 142 based on sunrise and sunset times included in the obtained weather report. As another example, if the weather forecast includes heavy rain, optimization module 340 may turn on light control device 142, associated with outside lighting, to provide increased visibility to customer premises 120.

Figure 9A:
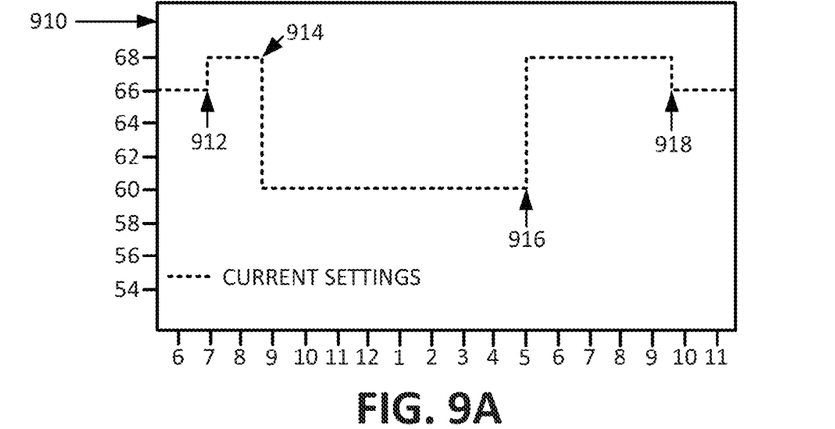
FIGS. 9A-9C are diagrams of example thermostat settings based on an obtained weather forecast.
Figure 9B:
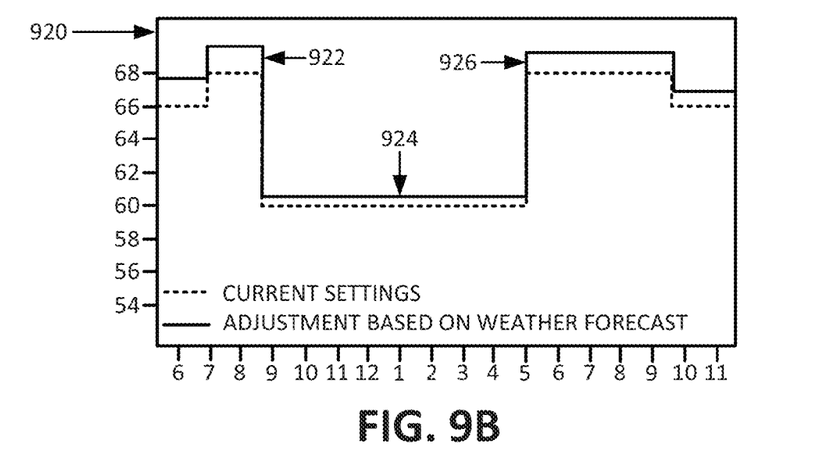
Figure 9C:
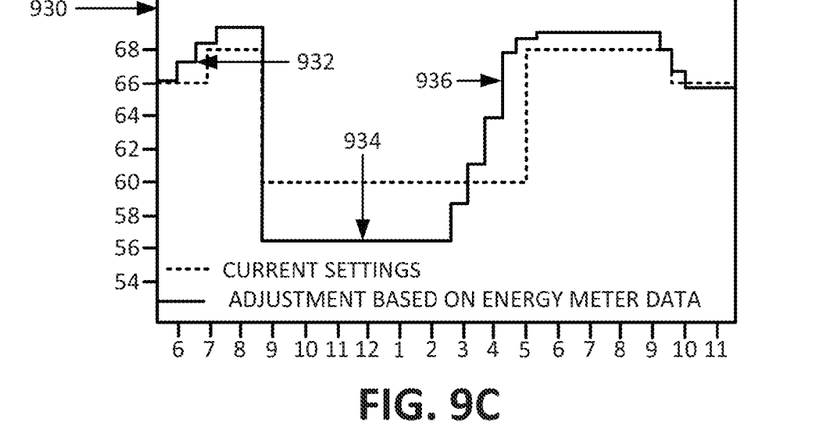

FIGS. 9A-9C are diagrams of example thermostat settings that may be generated by home monitoring system 130. FIG. 9A illustrates a first graph 910 that relates particular times to particular thermostat temperature settings for a particular day and that may exemplify thermostat settings for a typical day. First graph 910 may include a first temperature increase 912, a first temperature decrease 914, a second temperature increase 916, and a second temperature decrease 918. Graph 910 may start at 6 AM at a temperature of 66° F., corresponding to a time when residents of customer premises 120 are sleeping. At 7 AM, first temperature increase 912 may result in an increase to a temperature of 68° F., corresponding to a time when residents of customer premises 120 wake up and prepare to leave for work. The temperature may have been set during this time to increase thermal comfort as the residents wake up. At 9 AM, first temperature decrease 914 may result in a decrease to a temperature of 60° F., corresponding to a time when the residents of customer premises 120 have left for work and when no one is home. The temperature may have been set back during this time to save energy.

At 5 PM, second temperature increase 916 may result in an increase to a temperature of 68° F., corresponding to a time when residents of customer premises 120 are returning home from work. The temperature may have been set to increase during this time to increase thermal comfort. Finally, at 9:30 PM, second temperature decrease 918 may result in a decrease to a temperature of 66° F., corresponding to a time when the residents of customer premises 120 are going to sleep. The temperature may have been set back during this time to save energy.

In one implementation, the thermostat temperature settings of graph 910 may have been set manually by the customer. In another implementation, the thermostat temperature settings of graph 910 may have been determined by optimizing module 340 based on data stored in history memory 360. For example, based on information stored in settings field 520, energy meter field 540, and/or security sensor field 550, optimization module 340 may determine a range of times when the residents wake up, leave for work, return from work, and/or go to sleep. Optimization module 340 may suggest thermostat set back settings based on the determined range of times to the customer via STB 124 and the customer may select to accept the suggested thermostat set back settings via remote control 126.

FIG. 9B illustrates a second graph 920 that relates particular times to particular thermostat temperature settings for a particular day and that may represent temperature offsets generated based on an obtained weather forecast. Assume the obtained weather forecast includes an expected cloudy day, with a high temperature of 45° F. and a low temperature of 23° F., a humidity level of 45%, and a wind speed of 30 mph. Based on the obtained weather forecast, second graph 920 may include a first offset 922, a second offset 924, and a third offset 926.

First offset 922 may correspond to a recommended temperature increase of 2° F. between the hours of 6 AM and 9 AM and may be based on the expected low temperature of 23° F., which may result in a low mean radiant temperature for customer premises 120, and on the expected low humidity of 45%. The low mean radiant temperature and the low humidity may result in a lower thermal comfort, which may by increased by setting the thermostat temperature higher by the determined offset. Second offset 924 may be lower than the first offset 922 because of the expected effect of sunlight during the day. Third offset 926 may similarly be based on the expected temperature and humidity forecast.

FIG. 9C illustrates a third graph 930 that relates particular times to particular thermostat temperature settings for a particular day and that may represent adjustments made to second graph 930 based on thermostat settings history and based on energy meter data. Based on obtained thermostat setting history and based on obtained energy meter data, third graph 930 may include a first adjustment 932, a second adjustment 934, and a third adjustment 936.

First adjustment 932 may include a series of incremental steps in the set temperature from a temperature of 66° F. (when the residents of customer premises 120 are presumed to be sleeping) to a temperature of 70° F. (when the residents of customer premises 120 have woken up). The series of incremental steps may be based on information from a series of history records 501 when a temperature was set to increase from 66° F. to 70° F. Based on data from energy meter 146, from the series of history records 501, optimization module 340 may be able to determine how long it took thermostat device 145 to heat up from 66° F. to 70° F. Optimization module 340 may determine the series of incremental steps so that the temperature inside customer premises 120 ends up at 70° F. at the set time of 7 AM. The series of incremental steps may be determined in such a way as to optimize energy use.

Second adjustment 934 may correspond to a drop to a temperature of 56° F. Second adjustment 934 may be determined based on data from another series of history records 501. Optimization module 340 may determine that the temperature may be set back to 56° F. to reduce energy use and may be increased to the set temperature of 70° F. by 5 PM. Third adjustment 936 may include a series of incremental steps to increase the temperature from 56° F. to 70° F. Second adjustment 934 and third adjustment 936 may result in an optimum saving in energy while still attaining the desired temperature in time to coincide with the return of the residents of customer premises 120 home from work.

Figure 10:
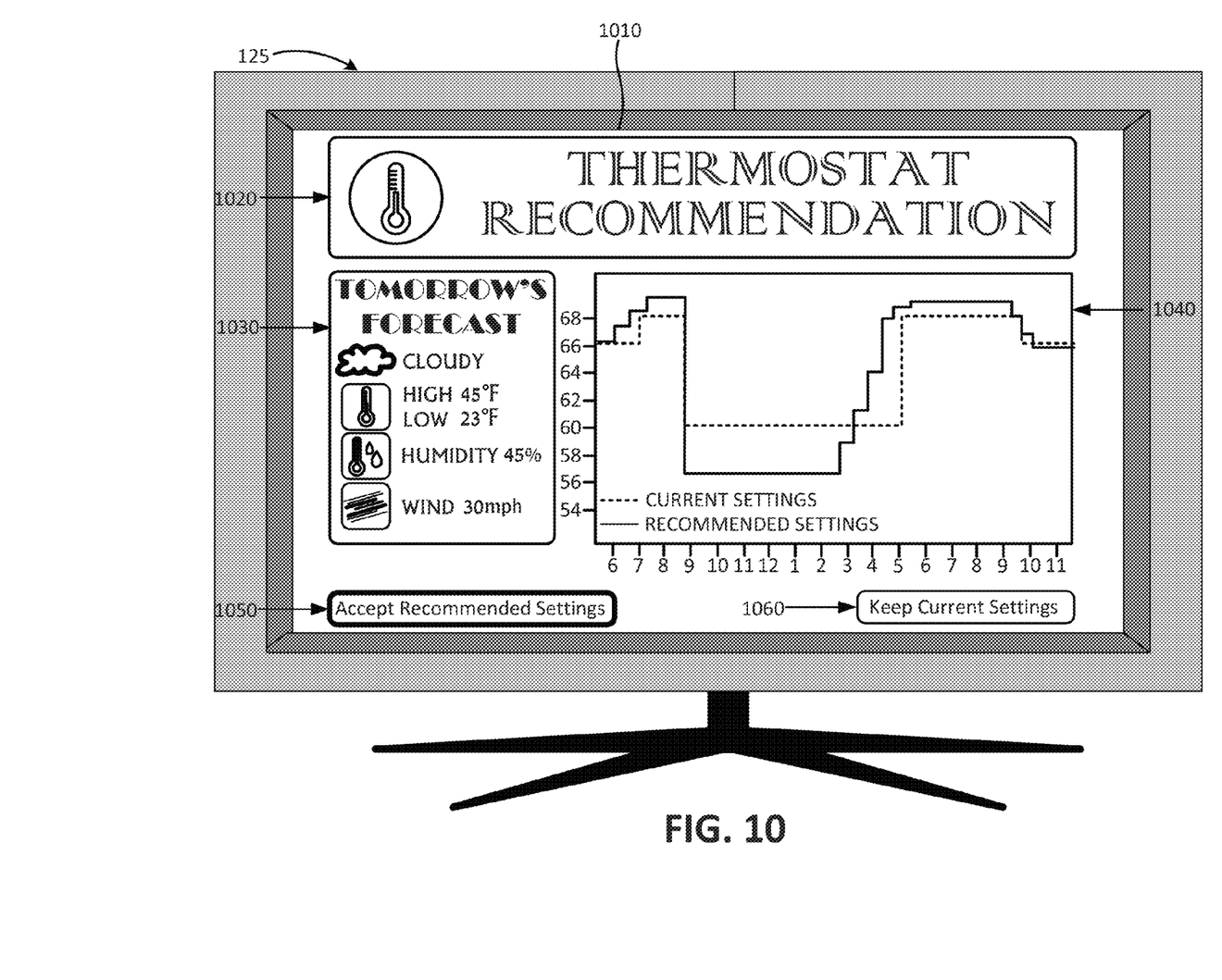
FIG. 10 is an exemplary user interface to present an optimum thermostat setting according to an implementation described herein.

FIG. 10 is an exemplary user interface 1010 that may be provided by STB 124 via television 125 to the customer. User interface 1010 may present a set of thermostat settings based on an obtained weather report and based on thermostat setting history data and energy meter data. In one implementation, user interface 1010 may be presented to the customer automatically in response to the customer activating STB 124. In another implementation, user interface 1010 may be presented to the customer in response to the customer selecting a home monitoring system function from a list of functions selectable via STB 124.

User interface 1010 may include an indication 1020 of a thermostat recommendation, a weather report 1030, a thermostat settings recommendation 1040, a button 1050 to accept the recommendation, and a button 1060 to reject the recommendation. The customer may preview weather report 1030 and thermostat settings recommendation 1040. The customer may select either button 1050 to accept the recommendation or button 1060 to reject the recommendation and maintain the previous thermostat settings. In another implementation, the recommendation may be accepted by default without requiring a customer's selection.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions, A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
    obtaining, by the computer device, a weather forecast for a geographic area associated with a customer premises, wherein the weather forecast is associated with a particular time period within a day, and wherein the particular time period comprises a plurality of particular times;
    determining, by the computer device and based on the weather forecast, predicted temperatures for the plurality of particular times;
    determining, by the computer device, a temperature offset for each particular time of the plurality of particular times based on the predicted temperatures and a historic thermostat setting corresponding to each particular time of the plurality of particular times;
    determining, by the computer device, a thermostat setting for the customer premises based on the determined plurality of temperature offsets;
    determining, by the computer device and based on the weather forecast, settings for a home monitoring device, wherein the settings are based on the weather forecast, and wherein the home monitoring device comprises at least one of a security sensor, a motion detector, or a light controller;
    providing, by the computer device, to a set-top box associated with the customer premises, and via a network device from which the customer premises receives television content from a television content provider, a recommendation about the determined thermostat setting and the determined settings for the home monitoring device, wherein the recommendation is displayed on a television;
    receiving, by the computer device, an indication from the set-top box that the recommendation was accepted; and
    applying, by the computer device, the determined thermostat setting to a thermostat controller associated with the customer premises and the determined settings to the home monitoring device, in response to receiving the indication from the set-top box that the recommendation was accepted.

2. The method of claim 1, further comprising:
    obtaining information about a type of heating system or cooling system associated with the customer premises; and
    modifying the determined thermostat setting based on the obtained information about the type of heating system or cooling system associated with the customer premises.

3. The method of claim 1, further comprising:
    obtaining data from an energy meter associated with the customer premises, wherein the energy meter records information about energy use associated with a heating system or a cooling system associated with the customer premises; and
    modifying the determined thermostat setting based on the obtained data from the energy meter.

4. The method of claim 1, further comprising:
    obtaining a thermostat setting history associated with the thermostat controller; and
    modifying the determined thermostat setting based on the obtained thermostat setting history.

5. The method of claim 1, wherein the obtained weather forecast includes information about a predicted humidity level, and wherein the method further includes:
    modifying the determined thermostat setting based on the predicted humidity level.

6. The method of claim 1, further comprising:
    obtaining data associated with the security sensor; and
    modifying the determined thermostat setting based on the obtained data associated with the security sensor.

7. The method of claim 1, further comprising:
    determining a setting for the motion detector based on the obtained weather forecast; and
    applying the determined setting to the motion detector.

8. The method of claim 1, further comprising:
    determining a setting for the light controller based on the obtained weather forecast; and
    applying the determined setting to the light controller.

9. The method of claim 1, wherein determining the temperature offset for each particular time includes looking up the temperature offset in a table using the predicted temperature at the particular time and the historic thermostat setting at the particular time.

10. A system comprising:
a set-top box, associated with a customer premises, configured to:
receive, from a content provider, a television signal via a network device; and
provide the television signal to a television;
a home monitoring module configured to:
obtain a weather forecast for a geographic area associated with the customer premises, wherein the weather forecast is associated with a particular time period within a day, and wherein the particular time period comprises a plurality of particular times;
determine, based on the weather forecast, a predicted temperature for the plurality of particular times;
determine a temperature offset for each particular time of the plurality of particular times based on the predicted temperature and a historic thermostat setting corresponding to each particular time of the plurality of particular times;
determine a thermostat setting for the customer premises based on the determined plurality of temperature offsets;
determine, based on the weather forecast, settings for a home monitoring module, wherein the settings are based on the weather forecast, and wherein the home monitoring device comprises at least one of a security sensor, a motion detector, or a light controller; and
provide a recommendation about the determined thermostat setting and the determined settings for the home monitoring module to the set-top box via the network device;
wherein the set-top box is further configured to:
present the recommendation about the determined thermostat setting and the settings for the home monitoring module via the television;
receive a selection of the recommendation; and
provide an indication of the selection to the home monitoring module; and
wherein the home monitoring module is further configured to:
apply the determined thermostat setting to a thermostat controller associated with the customer premises and the determined settings to the home monitoring module, in response to receiving the indication from the set-top box.

11. The system of claim 10, wherein the home monitoring module is further configured to:
obtain information about a type of heating system or cooling system associated with the customer premises; and
modify the determined thermostat setting based on the obtained information about the type of heating system or cooling system associated with the customer premises.

12. The system of claim 10, wherein the home monitoring module is further configured to:
obtain data from an energy meter associated with the customer premises, wherein the energy meter records information about energy use associated with a heating system or a cooling system associated with the customer premises; and
modify the determined thermostat setting based on the obtained data from the energy meter.

13. The system of claim 10, wherein the home monitoring module is further configured to:
obtain a thermostat setting history associated with the thermostat controller; and
modify the determined thermostat setting based on the obtained thermostat setting history.

14. The system of claim 10, wherein the obtained weather forecast includes information about a predicted humidity level, and wherein the home monitoring module is further configured to:
modify the determined thermostat setting based on the predicted humidity level.

15. The system of claim 10, wherein the home monitoring module is further configured to:
determine a setting for the motion detector based on the obtained weather forecast; and
apply the determined setting to the motion detector.

16. The system of claim 10, wherein the home monitoring module is further configured to:
determine a setting for the light controller based on the obtained weather forecast; and
apply the determined setting to the light controller.

17. The system of claim 10, wherein, when determining the temperature offset for each particular time, the home monitoring device is further configured to look up the temperature offset in a table using the predicted temperature at the particular time and the historic thermostat setting at the particular time.

18. A non-transitory computer-readable medium storing instructions executable by one or more processors, the non-transitory computer-readable medium comprising:
one or more instructions to obtain a weather forecast for a geographic area associated with a customer premises, wherein the weather forecast is associated with a particular time period within a day, and wherein the particular time period comprises a plurality of particular times;
one or more instructions to determine, based on the weather forecast, predicted temperatures for the plurality of particular times;
one or more instructions to determine a temperature offset for each particular time of the plurality of particular times based on the predicted temperature and a historic thermostat setting corresponding to each particular time of the plurality of particular times;
one or more instructions to determine a thermostat setting for the customer premises based on the determined plurality of temperature offsets;
one or more instructions to determine, based on the weather forecast, settings for a home monitoring device, wherein the settings compensate for the weather forecast, and wherein the home monitoring device comprises at least one of a security sensor, a motion detector, or a light controller;
one or more instructions to provide, to a set-top box associated with the customer premises and via a network device from which the customer premises receives television content from a television content provider, a recommendation about the determined thermostat setting and the determined settings for the home monitoring device, wherein the recommendation is displayed on a television;
one or more instructions to receive an indication from the set-top box that the recommendation was accepted; and
one or more instructions to apply the determined thermostat setting to a thermostat controller associated with the customer premises and the determined settings to the home monitoring device, in response to receiving the indication from the set-top box that the recommendation was accepted.

19. The non-transitory computer-readable medium of claim 18, further comprising:
one or more instructions to obtain data from an energy meter associated with the customer premises, wherein the energy meter records information about energy use associated with a heating system or a cooling system associated with the customer premises; and
one or more instructions to modify the determined thermostat setting based on the obtained data from the energy meter.

20. The non-transitory computer-readable medium of claim 18, further comprising:
one or more instructions to determine a setting for the motion detector or the light controller based on the obtained weather forecast; and
one or more instructions to apply the determined setting to the motion detector or light controller.

* * * * *